United States Patent
Matsumiya et al.

(10) Patent No.: US 10,197,382 B2
(45) Date of Patent: Feb. 5, 2019

(54) CHROMATIC CONFOCAL SENSOR

(71) Applicant: Mitutoyo Corporation, Kawasaki-shi, Kanagawa (JP)

(72) Inventors: Sadayuki Matsumiya, Kawasaki (JP); Kenji Okabe, Kawasaki (JP); Koji Kubo, Kawasaki (JP); Nobuya Kaneko, Kawasaki (JP)

(73) Assignee: MITUTOYO CORPORATION, Kawasaki-Shi (JP)

(*) Notice: Subject to any disclaimer, the term of this patent is extended or adjusted under 35 U.S.C. 154(b) by 0 days.

(21) Appl. No.: 15/724,328

(22) Filed: Oct. 4, 2017

(65) Prior Publication Data

US 2018/0112966 A1 Apr. 26, 2018

(30) Foreign Application Priority Data

Oct. 20, 2016 (JP) .................... 2016-205754

(51) Int. Cl.
| | | |
|---|---|---|
| G01N 33/08 | (2006.01) | |
| G01B 11/00 | (2006.01) | |
| G01J 3/02 | (2006.01) | |
| G01J 3/28 | (2006.01) | |
| G01B 11/06 | (2006.01) | |

(52) U.S. Cl.
CPC ........ G01B 11/002 (2013.01); G01B 11/0608 (2013.01); G01J 3/0218 (2013.01); G01J 3/2823 (2013.01); G01B 2210/50 (2013.01)

(58) Field of Classification Search
CPC ....... G01B 11/24; G01B 11/25; G01B 11/245; G01B 11/2518; G01B 11/026
USPC ........................................... 356/62
See application file for complete search history.

(56) References Cited

U.S. PATENT DOCUMENTS

| | | | |
|---|---|---|---|
| 2006/0109483 A1 | 5/2006 | Marx et al. | |
| 2010/0128221 A1* | 5/2010 | Muller | G02B 21/0028 351/207 |
| 2011/0013186 A1* | 1/2011 | Miki | G01B 11/026 356/364 |
| 2015/0141753 A1* | 5/2015 | Kanamori | H01L 27/14627 600/109 |
| 2017/0115180 A1* | 4/2017 | Hirata | G01M 11/0242 |

* cited by examiner

Primary Examiner — Md M Rahman
(74) Attorney, Agent, or Firm — Rankin, Hill & Clark LLP

(57) ABSTRACT

A chromatic confocal sensor includes a light source portion that emits a plurality of light beams having different wavelengths; an objective lens that converges the plurality of light beams at different focal positions; an emission port from which measurement light reflected by an object to be measured at the focal positions out of the plurality of light beams is emitted; a position calculation portion that calculates a position of the object to be measured based on the emitted measurement light; an observation portion including an observation light source that emits observation light and an image sensor; and a beam splitter that emits at least a part of the measurement light that passes through the objective lens to the emission port and emits at least a part of the observation light that passes through the objective lens and is reflected by the object to be measured to the image sensor.

14 Claims, 8 Drawing Sheets

CHROMATIC CONFOCAL SENSOR

CROSS REFERENCE TO RELATED APPLICATIONS

This application claims the benefit of Japanese Priority Patent Application JP 2016-205754 filed Oct. 20, 2016, the entire contents of which are incorporated herein by reference.

BACKGROUND

The present invention relates to a chromatic confocal sensor.

From the past, a technology of a chromatic confocal sensor has been used for measuring a height of an object to be measured, and the like. For example, US Patent Application Publication No. 2006/0109483 (hereinafter, referred to as Patent Literature 1) discloses a structure in which a microscope and a chromatic confocal sensor are integrated. As shown in FIG. 5 of Patent Literature 1, a beam splitter 6 is arranged before an objective lens 7 of the microscope. A confocal optical system including an afocal dispersion lens 5 and the like is combined with the beam splitter 6 being a starting point.

SUMMARY

For realizing a highly accurate measurement using the chromatic confocal sensor, sensor positioning, check of a measurement part, and the like become important.

In view of the circumstances as described above, the present invention aims at providing a chromatic confocal sensor capable of highly accurately measuring an object to be measured.

For attaining the object described above, a chromatic confocal sensor according to an embodiment of the present invention includes a light source portion, an objective lens, an emission port, a position calculation portion, an observation portion, and a beam splitter.

The light source portion emits a plurality of light beams having different wavelengths.

The objective lens converges each of the plurality of light beams at different focal positions.

From the emission port, measurement light reflected by an object to be measured at the focal positions out of the plurality of light beams is emitted.

The position calculation portion calculates a position of the object to be measured based on the emitted measurement light.

The observation portion includes an observation light source that emits observation light and an image sensor.

The beam splitter emits at least a part of the measurement light that passes through the objective lens to the emission port and emits at least a part of the observation light that passes through the objective lens and is reflected by the object to be measured to the image sensor.

In this chromatic confocal sensor, the observation portion including the observation light source and the image sensor and the beam splitter are separated. By the beam splitter, the measurement light and observation light that are reflected by the object to be measured and pass through the objective lens are emitted toward the emission port and the image sensor, respectively. By an image based on an output of the image sensor, and the like, positioning accuracy can be improved, and a measurement part can be checked easily. As a result, it becomes possible to highly accurately measure the object to be measured.

The beam splitter may be arranged between the objective lens and the emission port and may emit the plurality of light beams emitted from the light source portion and the observation light emitted from the observation light source toward the objective lens along the same optical axis.

With this configuration, a coaxial observation that uses the objective lens becomes possible, and measurement accuracy can be improved.

The light source portion may emit light of a plurality of wavelengths included in a predetermined wavelength band. In this case, the observation light source may emit light of a wavelength not included in the predetermined wavelength band. Further, the beam splitter may be a dichroic mirror that separates the light of the plurality of wavelengths emitted from the light source portion and the light of the wavelength emitted from the observation light source.

With this configuration, it becomes possible to suppress a loss of a light amount of each of the measurement light and the observation light so as to enable highly accurate measurement and observation to be performed.

The observation portion may be configured as a unit. In this case, the chromatic confocal sensor may further include a connection portion that is provided while using a position of the beam splitter as a reference and from which the observation portion can be detached.

With this configuration, it becomes possible to easily replace the observation portion with other types of observation portions or other units and realize observations, guide light irradiations, and the like for different purposes.

The chromatic confocal sensor may further include a guide light irradiation portion that is connectable with the connection portion and is configured as a unit including a laser light source that emits guide light. In this case, the beam splitter may emit the guide light emitted from the laser light source of the guide light irradiation portion connected to the connection portion toward the objective lens.

It becomes possible to visually check the measurement part by the guide light and improve positioning accuracy. As a result, it becomes possible to highly accurately measure the object to be measured.

A spot shape of the guide light to be irradiated onto the object to be measured may be a ring shape.

With this configuration, it becomes possible to irradiate the guide light in a ring shape around a measurement point and realize high measurement accuracy.

The observation light may be visible light.

With this configuration, it becomes possible to use the observation light as the guide light and highly accurately measure the object to be measured.

The light source portion may emit white light. In this case, the observation light source may emit infrared light.

With this configuration, it becomes possible to highly accurately measure the object to be measured.

The guide light may be visible light.

With this configuration, it becomes possible to highly accurately measure the object to be measured.

The observation light source may emit light that is the same as that of the light source portion. In this case, the beam splitter may be a half mirror.

With this configuration, it becomes possible to execute the measurement and observation using the same light and improve measurement accuracy.

The light source portion and the observation light source may emit white light.

With this configuration, it becomes possible to generate a full-color image of the measurement part and improve measurement accuracy.

The observation portion may include a correction lens that corrects an aberration of the observation light reflected by the object to be measured, the aberration being caused by the objective lens.

With this configuration, it becomes possible to perform observations with high accuracy.

As described above, according to the present invention, it becomes possible to highly accurately measure the object to be measured. It should be noted that the effects described herein are not necessarily limited, and any effect described in the specification may be obtained.

DETAILED DESCRIPTION OF EMBODIMENTS

Hereinafter, embodiments of the present invention will be described with reference to the drawings.

Figure 1:
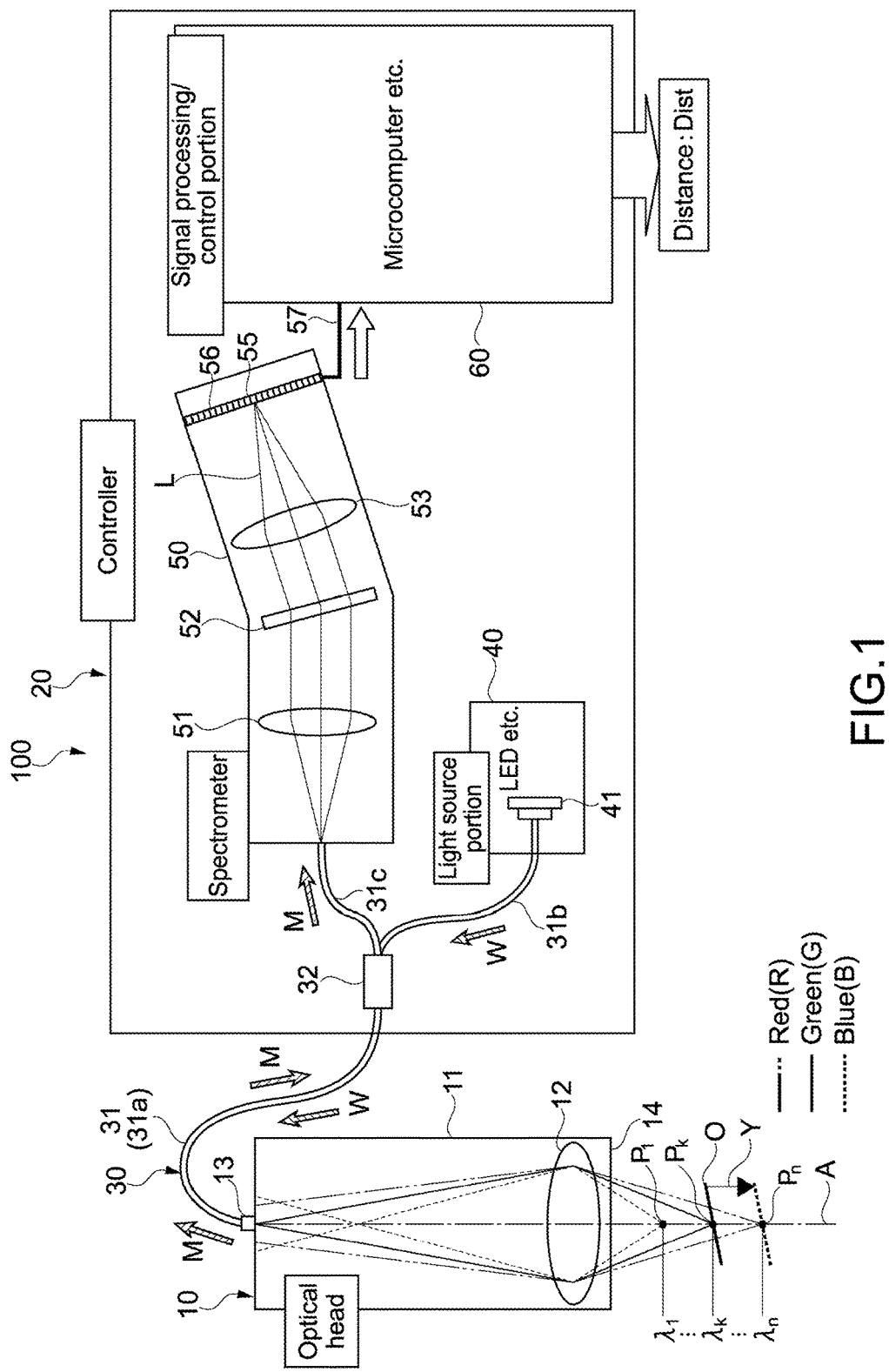
FIG. 1 is a schematic diagram showing a configuration example of a chromatic confocal sensor according to an embodiment.

FIG. 1 is a schematic diagram showing a configuration example of a chromatic confocal sensor according to an embodiment of the present invention. The chromatic confocal sensor is also called chromatic point sensor (CPS: Chromatic Confocal position Sensor). In descriptions below, the chromatic confocal sensor will be referred to as chromatic sensor.

A chromatic sensor 100 includes an optical head 10, a controller 20, and an optical fiber portion 30. The controller 20 includes a light source portion 40, a spectrometer 50, and a signal processing/control portion (hereinafter, simply referred to as control portion) 60.

It should be noted that the optical head 10 shown in FIG. 1 is schematically shown for explaining a measurement principle of the chromatic sensor 100, and a specific configuration will be described later.

A white LED 41 is provided as a measurement light source in the light source portion 40. Therefore, white light W including a plurality of visible light beams having different wavelengths from a blue wavelength range to a red wavelength range is emitted from the light source portion 40. In this embodiment, white light W including light of a plurality of wavelengths included in a wavelength band from about 450 nm to about 660 nm is emitted, but a specific wavelength band is not limited. It should be noted that a mercury lamp or the like may be used in place of a solid-state light source such as an LED.

The optical fiber portion 30 includes a plurality of optical fibers 31 and a fiber splitter 32. The plurality of optical fibers 31 include an optical fiber 31a connected to the optical head 10, an optical fiber 31b connected to the light source portion 40, and an optical fiber 31c connected to the spectrometer 50. The optical fibers 31a to 31c are connected to the fiber splitter 32.

The fiber splitter 32 splits light introduced from the optical fiber 31a and leads it to the optical fiber 31c. The fiber splitter 32 also splits light introduced from the optical fiber 31b and leads it to the optical fiber 31a.

Therefore, the white light W emitted from the light source portion 40 is guided to the optical head 10 via the optical fiber portion 30. Further, measurement light M (details of which will be given later) emitted from the optical head 10 is guided to the spectrometer 50 via the optical fiber portion 30. It should be noted that an optical fiber coupler may be used in place of the fiber splitter 32.

The optical head 10 includes a pen-like casing portion 11 having a longitudinal direction as an optical axis A and an objective lens 12 provided inside the casing portion 11. The optical fiber 31a is connected to a connection port 13 provided at substantially a center of a rear end of the casing portion 11, so that white light W is emitted inside the casing portion 11. The white light W emitted from the optical fiber 31a passes through the objective lens 12 and is irradiated from an irradiation surface 14 provided at a front end of the casing portion 11 toward an object to be measured O.

The objective lens 12 is a lens designed for a chromatic sensor and causes an axial chromatic aberration. Specifically, the objective lens 12 converges light that has entered the optical head 10 at focal positions P each corresponding to a wavelength λ on the optical axis A. Therefore, in this embodiment, the plurality of visible light beams included in the white light W are converged by the objective lens 12 at mutually-different focal positions P that correspond to the wavelength λ.

As shown in FIG. 1, the plurality of visible light beams included in the white light W are separated from one another and emitted toward the object to be measured O from the irradiation surface 14 of the casing portion 11. It should be noted that in FIG. 1, light of 3 colors of RGB represent the plurality of visible light beams separated by the objective lens 12. Of course, light of other colors (other wavelengths) is also emitted.

A wavelength λ1 and focal position P1 shown in FIG. 1 represent a wavelength and focal position of visible light having a shortest wavelength out of the plurality of visible light beams and correspond to, for example, blue light B. A wavelength λn and focal position Pn represent a wavelength and focal position of visible light having a longest wavelength out of the plurality of visible light beams and correspond to, for example, red light R. A wavelength λk and focal position Pk represent a wavelength and focal position of arbitrary visible light out of the plurality of visible light beams, and green light G is exemplified in FIG. 1 (k=1 to n).

Further, the objective lens 12 converges visible light reflected by the object to be measured O at the focal position Pk, at the optical fiber 31a. Specifically, the connection port 13 at the rear end of the casing portion 11 is provided at a confocal position where visible light focused on and reflected by the object to be measured O is converged by the objective lens 12. By connecting the optical fiber 31a to the connection port 13, visible light reflected by the object to be measured O at the focal position Pk out of the plurality of visible light beams can be selectively emitted as the measurement light M.

In FIG. 1, light of the 3 colors of RGB reflected by the object to be measured O is illustrated between the objective lens 12 and the connection port 13. In the example shown in FIG. 1, the object to be measured O is present at the focal position Pk (focal position of green light G in figure). Therefore, the green light G reflected by the object to be measured O is converged at the optical fiber 31a. As a result, reflected light of the green light G is emitted via the optical fiber 31a as the measurement light M. The wavelength of the measurement light M emitted in this way and the position of the object to be measured O on the optical axis A are in a one-on-one relationship.

It should be noted that the connection port 13 to which the optical fiber 31a is connected corresponds to an emission port that emits the measurement light M in this embodiment. A pinhole, an aperture, or the like may be used for selectively emitting the measurement light M. Moreover, a configuration of the confocal optical system in the casing portion 11 is not limited and may be designed as appropriate.

The spectrometer 50 is a block for detecting a wavelength of the measurement light M emitted from the optical head 10 via the optical fiber 31a. The measurement light M is irradiated inside the spectrometer 50 via the optical fiber 31a, the fiber splitter 32, and the optical fiber 31c.

In the spectrometer 50, a collimator lens 51, a diffraction grating 52, an imaging lens 53, and a linear sensor 55 are arranged in order from a side that the measurement light M enters. The collimator lens 51 irradiates the measurement light M emitted from the optical fiber 31c substantially uniformly onto the diffraction grating 52.

The diffraction grating 52 diffracts the measurement light M that has been irradiated substantially uniformly. The imaging lens 53 images diffracted light L diffracted by the diffraction grating 52 on the linear sensor 55 in a spot. Typically, +1-order diffracted light L is imaged on the linear sensor 55, but other diffracted light such as −1-order diffracted light may be imaged instead. It should be noted that a specific configuration of the diffraction grating 52 is not limited.

The linear sensor 55 includes a plurality of pixels (light-receiving elements) 56 arranged in one direction. Each of the pixels 56 outputs a signal corresponding to an intensity of received light. A specific configuration of the linear sensor 55 is not limited, and a CMOS line sensor, a CCD line sensor, or the like is used, for example.

It should be noted that the imaging lens 53 is a lens having a small chromatic aberration and is capable of imaging the diffracted light L on the linear sensor 55 in a spot irrespective of the wavelength of the measurement light M. On the other hand, an emission angle of the diffracted light L emitted from the diffraction grating 52 depends on the wavelength of the measurement light M. Therefore, the spot position on the linear sensor 55 becomes a parameter that depends on the wavelength of the measurement light M.

Signals output from the linear sensor 55 are transmitted to the control portion 60 via a signal cable 57. It should be noted that a light shield mechanism or the like may be provided so that diffracted light does not enter the linear sensor 55 except for the diffracted light L to become a spot position detection target. Moreover, an arrangement angle or the like of the diffraction grating 52 and the linear sensor 55 may be adjusted as appropriate.

The control portion 60 functions as a position calculation portion in this embodiment and calculates a position of the object to be measured O based on signals received from the linear sensor 55. For example, the optical head 10 is held at a predetermined reference position, and white light W is emitted to the object to be measured O. Then, the position of the object to be measured O is calculated based on the signals from the linear sensor 55 while using the reference position as a reference.

Alternatively, a distance between the optical head 10 and the object to be measured O may be calculated as the position of the object to be measured O. Further, even in a case where the object to be measured O moves, it is possible to calculate a movement amount of the object to be measured O based on the signals from the linear sensor 55 output according to the movement (see arrow Y in FIG. 1).

In a case where the optical head 10 is used above the object to be measured O, a height of the object to be measured O may be calculated as the position of the object to be measured O. Of course, the present invention is not limited to these, and it is also possible to use the optical head 10 in an arbitrary direction and calculate the position in that direction.

By such a position calculation, various measurements such as a measurement of an outline/shape in a mm order, a measurement of a minute shape in a μm order, and a measurement of a work surface property become possible, for example.

The control portion 60 can be realized by a microcomputer in which a CPU, a memory (RAM, ROM), I/O (Input/Output), and the like are accommodated in one chip, for example. Various types of processing to be carried out by the microcomputer can be executed by the CPU in the chip operating according to a predetermined program stored in the memory. Without being limited to this, other ICs (integrated circuits) and the like may be used as appropriate for realizing the control portion 60.

Figure 2:
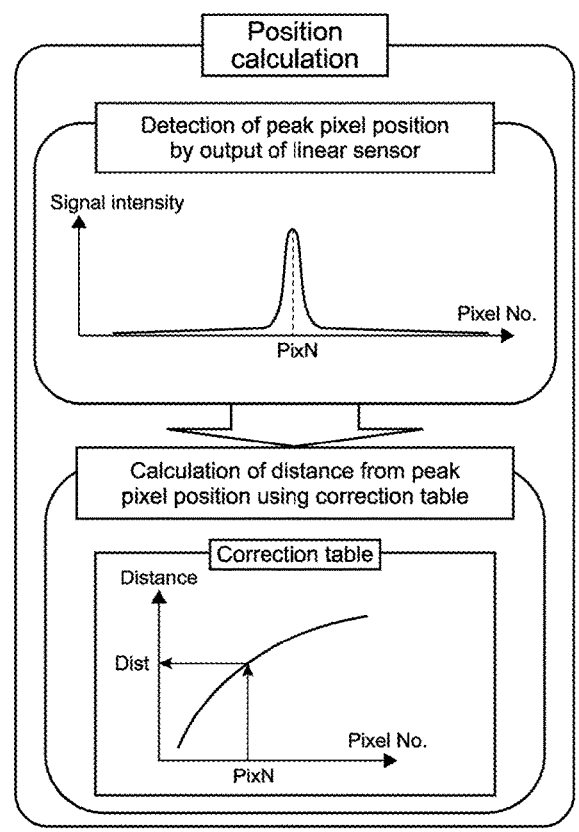
FIG. 2 is a chart showing an example where a position of an object to be measured is calculated by a control portion.

FIG. 2 is a chart showing an example where the position of the object to be measured O is calculated by the control portion 60. First, a position of the pixel 56 that outputs a signal intensity peak value (peak pixel position) is detected based on the signals output from the linear sensor 55. The peak pixel position corresponds to a light-receiving position of the diffracted light L received by the sensor and is expressed by a pixel number in this embodiment.

Based on the detected pixel number, the position of the object to be measured O (referred to as distance Dist herein) is calculated. As shown in FIG. 2, the distance Dist is calculated using a correction table. The correction table is created in advance by operating the chromatic sensor 100 while adjusting the distance Dist, for example, and is stored in the memory of the control portion 60 or the like. A method of creating the correction table, a creation timing, and the like are not limited.

The calculation of the distance Dist is not limited to the method that uses the correction table. For example, a predetermined calculation expression may be stored in the memory or the like so that the distance Dist is calculated from the pixel number using the calculation expression. Alternatively, the wavelength of the measurement light M may be calculated from the pixel number. Then, the distance Dist may be calculated from the wavelength using the correction table, the calculation, or the like.

Figure 3:
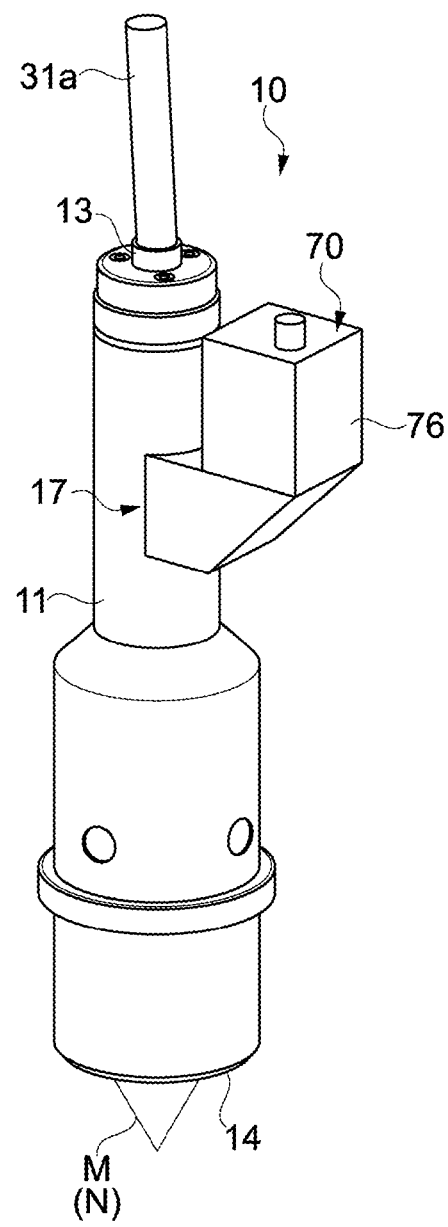
FIG. 3 is an external view showing a specific configuration example of an optical head.
Figure 4:
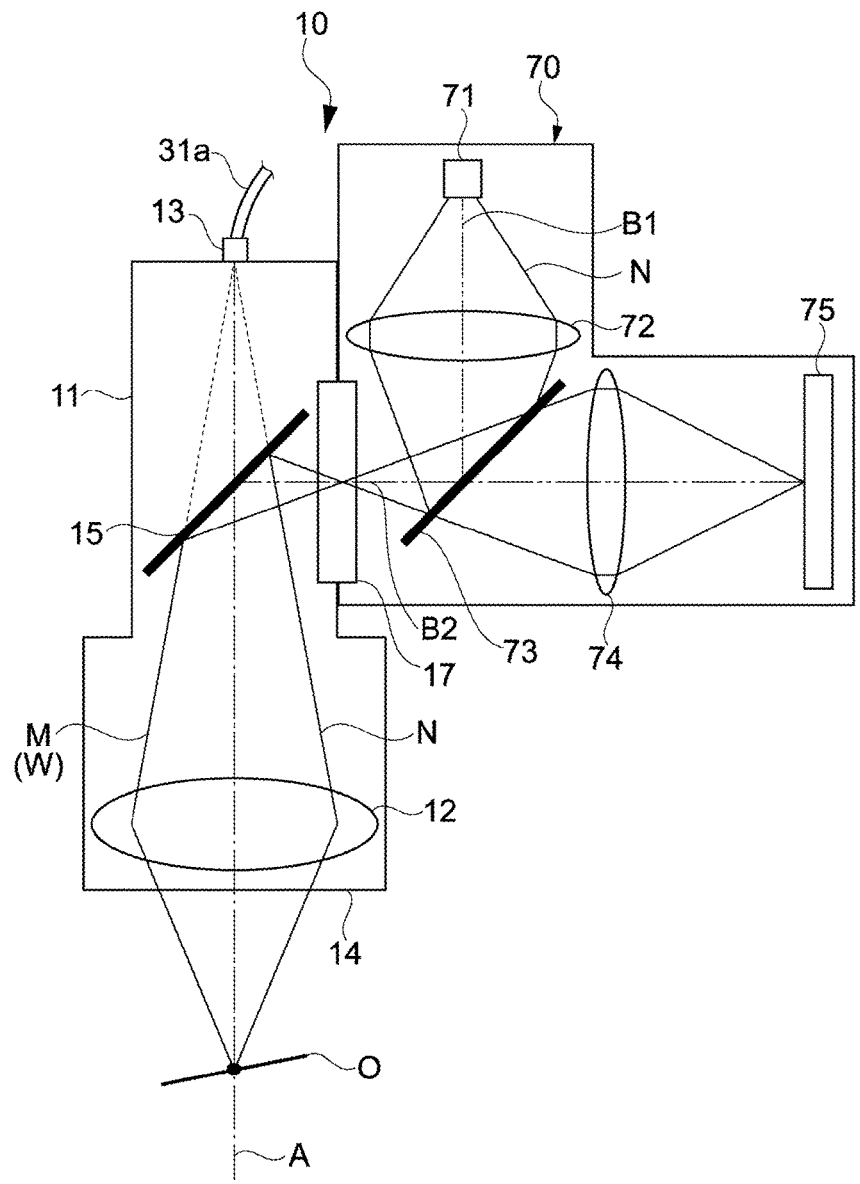
FIG. 4 is a schematic diagram showing an internal configuration example of the optical head.

FIG. 3 is an external view showing a specific configuration example of the optical head 10. FIG. 4 is a schematic diagram showing an internal configuration example of the optical head 10. As described with reference to FIG. 1, the optical head 10 includes the casing portion 11, the objective lens 12 including a chromatic aberration, and the connection port 13 to which the optical fiber 31a is connected. The optical head 10 also includes the irradiation surface 14 from which the plurality of visible light beams separated on the optical axis A are irradiated toward the object to be measured O.

Further, the optical head 10 includes a dichroic mirror 15 provided inside the casing portion 11, an observation unit 70, and a connection portion 17 for connecting the observation unit 70 to the casing portion 11.

The dichroic mirror 15 is arranged on the optical axis A between the objective lens 12 and the connection port 13. The dichroic mirror 15 includes a wavelength selectivity transmits white light W emitted from the optical fiber 31a. In other words, in this embodiment, the dichroic mirror 15 transmits light included in a wavelength band of about 450 nm to about 660 nm.

Meanwhile, the dichroic mirror 15 reflects observation light N (single wavelength of about 680 nm) emitted from an observation light source 71 provided in the observation unit 70. A specific configuration of the dichroic mirror 15 is not limited and may be designed as appropriate.

The measurement light M reflected by the object to be measured O passes through the objective lens 12 and enters the dichroic mirror 15. The dichroic mirror 15 transmits the measurement light M toward the connection port 13. In other words, the dichroic mirror 15 emits the measurement light M that passes through the objective lens 12 toward the connection port 13.

The observation unit 70 includes the observation light source 71, an illumination lens 72, a half mirror 73, an imaging lens 74, an image sensor 75, and a casing portion 76 that accommodates them. The observation unit 70 is configured as one unit and can be handled integrally by holding the casing portion 76, for example. It should be noted that although an outer shape of the casing portion 76 differs between FIGS. 3 and 4, the outer shape of the casing portion 76 is not limited and may be designed as appropriate.

The observation light source 71 is an LED that emits observation light N having a wavelength of about 680 nm. The wavelength of the observation light N is not limited, and light of an arbitrary wavelength not included in the wavelength band of the white light W can be adopted. For example, light having a single wavelength of about 430 nm deviated on a short wavelength side may be used. Moreover, other solid-state light sources, lamps, and the like may be used as the observation light source.

As shown in FIG. 4, the illumination lens 72 and the half mirror 73 are arranged along an optical axis B1 of the observation light source 71. Specific configurations of the illumination lens 72 and the half mirror 73 are not limited and may be designed as appropriate.

About 50% of the observation light N that passes through the illumination lens 72 are reflected by the half mirror 73 in a substantially-orthogonal direction. The reflected observation light N is emitted outwardly from an emission port (not shown). On a rear side of the half mirror 73, the imaging lens 74 and the image sensor 75 are arranged along an optical axis (optical axis of observation light N reflected by half mirror) B2 of that emitted observation light N. The rear side of the half mirror 73 refers to the other side of the side that the observation light N is emitted.

Therefore, in a case where the observation light N enters the half mirror 73 along the optical axis B2, about 50% of the observation light N that transmits through the half mirror 73 enters the image sensor 75 via the imaging lens 74. A specific configuration of the imaging lens 74 is not limited and may be designed as appropriate. For example, a CMOS area sensor, a CCD area sensor, or the like is used as the image sensor 75.

In this embodiment, the observation unit 70 corresponds to an observation unit including an observation light source and an image sensor. A configuration of the observation optical system in the observation unit 70 is not limited to that described above and may be designed arbitrarily.

The connection portion 17 is provided such that the observation unit 70 can be detached while using the position of the dichroic mirror 15 arranged inside the casing portion 11 as a reference. As shown in FIG. 4, the observation unit 70 is connected to the casing portion 11 such that the observation light N emitted from the observation unit 70 is reflected by the dichroic mirror 15 toward the objective lens 12 along the optical axis A. The connection portion 17 is configured for realizing such a connection.

For example, an opening (not shown) is formed on the casing portion 11 according to the position of the dichroic mirror 15. The emission port of the observation unit 70 is positioned at and fixed to the opening. For example, an engagement hole or engagement groove is formed near the opening, and a tip end portion of the observation unit 70 where the emission port is formed is fit into the engagement hold or the like. Then, both members are fixed to each other by a screw or the like. Alternatively, arbitrary configurations for connecting different members may be adopted, and those arbitrary configurations are included in the connection portion according to the present technology.

As the observation light source 71 is driven, the observation light N is emitted from the observation unit 70 toward the dichroic mirror 15 along the optical axis B2. The dichroic mirror 15 reflects the observation light N toward the objective lens 12 along the optical axis A. In other words, the dichroic mirror 15 emits the white light W and the observation light N toward the objective lens 12 along the same axis.

The observation light N reflected toward the objective lens 12 is irradiated onto the object to be measured O via the objective lens 12. In the example shown in FIG. 4, the observation light N and the measurement light M (white light W) are illustrated by the same light flux, but are not limited thereto. For example, there are cases where a diameter of an irradiation spot of the observation light N to be irradiated onto the object to be measured O becomes slightly larger than that when focused, due to an aberration property of the objective lens 12. Even in this case, it is possible to exert sufficient observation accuracy by appropriately setting the wavelength of the observation light N and the like, for example.

The observation light N reflected by the object to be measured O passes through the objective lens 12 and enters the dichroic mirror 15. The dichroic mirror 15 reflects the observation light N toward the observation unit 70 along the optical axis B2. The observation light N reflected along the optical axis B2 enters the image sensor 75 via the half mirror 73 and the imaging lens 74. Therefore, the dichroic mirror 15 is capable of emitting the observation light N reflected by the object to be measured O toward the image sensor 75. In this embodiment, the dichroic mirror 15 corresponds to a beam splitter.

The drive of the observation light source 71 and the image sensor 75 is controlled by, for example, the control portion 60 of the controller 20. The control portion 60, the observation light source 71, and the image sensor 75 are connected by wires, wirelessly, or the like. Then, by the control portion 60, a control signal including a light-emitting amount or light-emitting timing of the observation light source 71 is output, and the observation light source 71 is driven.

Further, an output signal from the image sensor 75 is transmitted to the control portion 60, and an image of a measurement part or the like is generated and output to an external monitor or the like. In this embodiment, an image expressed in gray is generated based on the observation light N as single wavelength light. Of course, the control of the observation light source 71 and the image sensor 75, image generation, and the like may be executed by a block different from the control portion 60, or the like.

It should be noted that even in a case where invisible light such as near infrared light and infrared light is used as the observation light N, an image of a measurement part can be generated based on the output of the image sensor 75. In either case, by using light of a wavelength not included in a wavelength band of light to be used for the position measurement (hereinafter, referred to as measurement light), the dichroic mirror 15 can be used as the beam splitter. Accordingly, it becomes possible to suppress a loss of a light amount of each of the measurement light M and the observation light N so as to enable highly accurate measurement and observation to be performed.

In the descriptions above, in the chromatic sensor 100 of this embodiment, the dichroic mirror 15 is arranged in the confocal optical system inside the casing portion 11, and the observation unit 70 is connected in accordance with that position. Accordingly, a coaxial observation that uses the objective lens 12 for CPS becomes possible, and a monitoring function of a measurement part can be realized.

For example, by an image that is based on the output of the image sensor 75, it becomes possible to improve positioning accuracy of the optical head 10 and easily check the measurement part. Accordingly, it becomes possible to highly accurately measure the object to be measured O. Further, by using visible light as the observation light N as in this embodiment, the observation light N can be used as guide light. Accordingly, it becomes possible to improve operability and measurement accuracy in the position measurement.

By driving the light source portion 40 of the controller 20 and the observation light source 71 of the observation unit 70 at the same time, measurement operations and programming can be executed while checking an image of a measurement part on a monitor. Further, it is also possible to check a measurement state of the chromatic sensor 100 that operates according to a part program in real time by a video on a monitor. As a result, it becomes possible to immediately execute a program correction and the like and easily realize extremely high measurement accuracy.

It should be noted that the present invention is not limited to the case where the white light W and the observation light N are irradiated at the same time, and an irradiation timing of each light may be controlled as appropriate. For example, after the observation light N is irradiated and an observation of the measurement part is performed, the white light W may be irradiated in place of the observation light N so as to measure the object to be measured O.

Further, since the connection portion 17 capable of detachably connecting the unit is configured while using the position of the dichroic mirror 15 as a reference in this embodiment, it becomes possible to easily replace the unit with other types of observation unit or other units. Therefore, it becomes possible to realize observations, guide light irradiations, and the like for different purposes.

Figure 5:
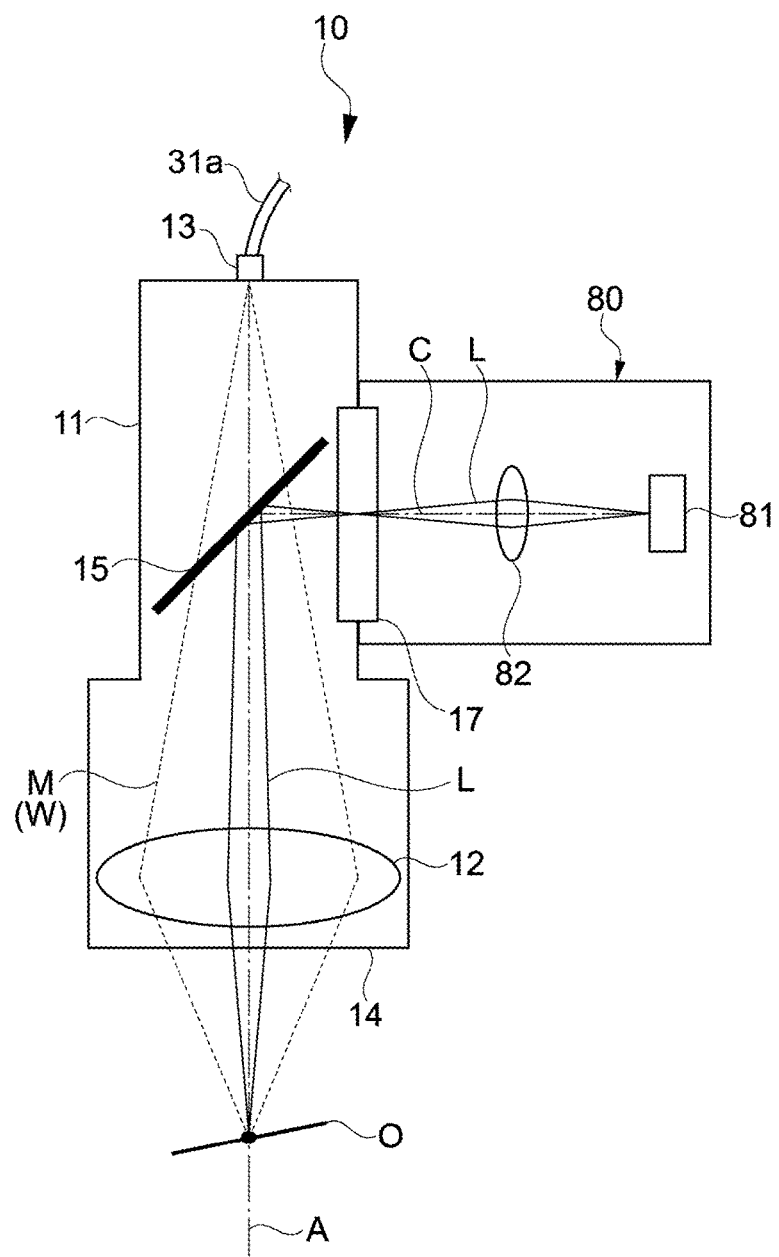
FIG. 5 is a schematic diagram showing a configuration example in a case where a guide light unit is connected.
Figure 6:
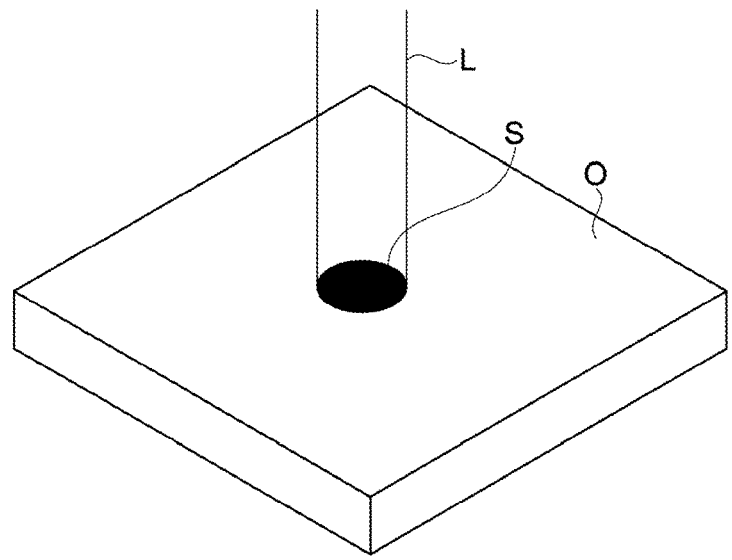
FIG. 6 is a schematic diagram showing an irradiation spot of guide light to be irradiated onto the object to be measured.

FIG. 5 is a schematic diagram showing a configuration example in a case where a guide light unit is connected in place of the observation unit 70. FIG. 6 is a schematic diagram showing an irradiation spot of guide light to be irradiated onto the object to be measured. A guide light unit 80 corresponds to a guide light irradiation portion in this embodiment.

The change of the unit to be connected to the connection portion 17 may be executed manually or may be executed automatically under control of the control portion 60 and the like. In the case of automatically changing the unit, an attachment mechanism including a holding arm that holds the unit and executes detachment/attachment, or the like, is configured, for example. The attachment mechanism may be configured inside the chromatic sensor 100 or may be configured externally.

The guide light unit 80 includes a laser light source 81 that emits guide light (laser light) L and a lens 82 that relays the emitted guide light L. Visible laser light is used as the guide light L so as to enable it to be visually checked. A specific wavelength of the guide light L is not limited, and laser light having a wavelength not included in the wavelength band of white light W for a position measurement (wavelength band of about 450 nm to about 660 nm) is used in this embodiment. For example, laser light having a wavelength of about 680 nm or about 430 nm is used.

As the guide light unit 80 is connected to the connection portion 17, guide light L that is emitted along an optical axis C enters the dichroic mirror 15. The dichroic mirror 15 reflects the guide light L toward the objective lens 12 along the optical axis A. Therefore, the guide light L is emitted to the object to be measured O along the same optical axis as the white light W. Accordingly, as shown in FIG. 6, the guide light L is irradiated onto a measurement part of the object to be measured O so that an irradiation spot S becomes viewable.

By attaching the guide light unit 80 in this way, it becomes possible to realize a guide function and easily view the measurement part. As a result, the object to be measured O can be measured highly accurately. Further, workability in measurement operations and programming can be significantly improved. It should be noted that typically, the light source portion 40 and the laser light source 81 are driven at the same time, and a measurement is executed while irradiating the guide light L. Of course, the present invention is not limited to this, and irradiation timings of the white light W and guide light L may be controlled as appropriate.

Figure 7:
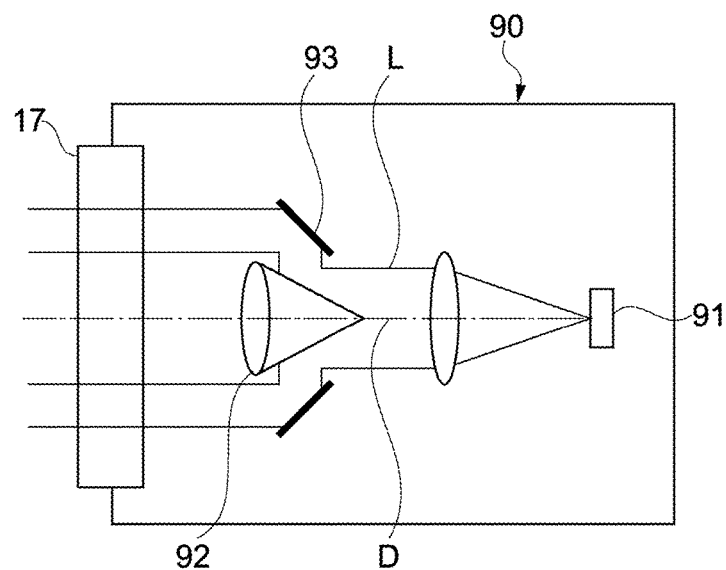
FIG. 7 is a schematic diagram showing another configuration example of the guide light unit.
Figure 8:
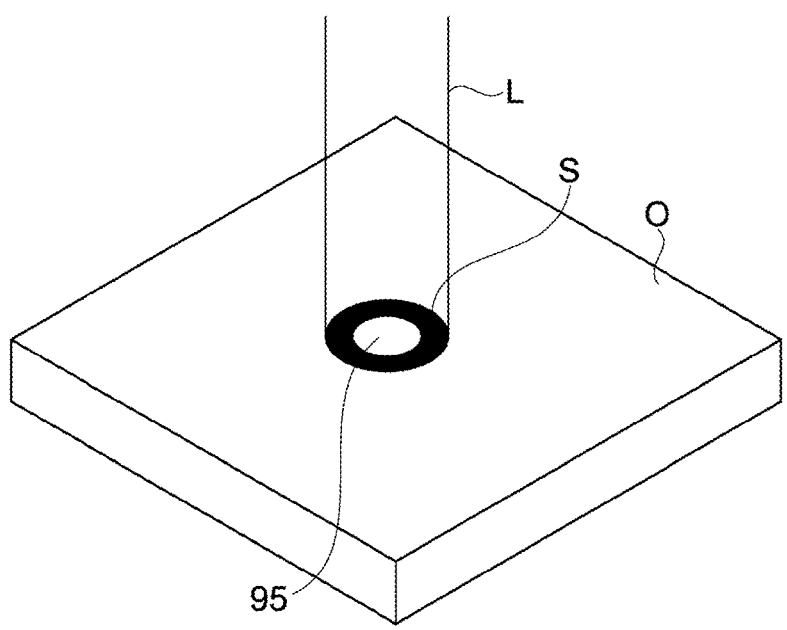
FIG. 8 is a schematic diagram showing an irradiation spot of guide light to be irradiated onto the object to be measured.

FIG. 7 is a schematic diagram showing another configuration example of the guide light unit. FIG. 8 is a schematic diagram showing the irradiation spot of the guide light irradiated onto the object to be measured.

This guide light unit 90 includes a shaping mechanism that shapes a spot shape of the guide light L to be irradiated onto the object to be measured O. Specifically, the guide light unit 90 includes a cone mirror 92 arranged on an optical axis D of the guide light L output from a laser light source 91 and reflection mirrors 93 arranged around the cone mirror 92.

As shown in FIG. 7, a cross-sectional shape of the guide light L is shaped into a ring shape by the shaping mechanism. Accordingly, the spot shape of the guide light L to be irradiated onto the object to be measured O becomes a ring shape. An inner area 95 of the irradiation spot S of the guide light L becomes a measurement area onto which a plurality of visible light beams are irradiated.

By attaching the guide light unit 90 and shaping a projection pattern of the guide light L in a ring shape, a laser sight function can be realized. In other words, it becomes possible to irradiate the guide light L in a periphery of a measurement point (measurement part) so as to enable positioning and a check of a measurement part to be performed without influencing the position measurement. As a result, high measurement accuracy can be realized. It should be noted that it does not necessarily mean that the position measurement will be influenced in a case where the guide light L is irradiated onto the measurement point and means that such a possibility can be sufficiently eliminated.

An arbitrary shape may be adopted as the shape of the irradiation spot S to be shaped. Further, a configuration of the shaping mechanism that shapes the shape of the irradiation spot S is also not limited and may be designed arbitrarily.

A wavelength-confocal-type non-contact displacement meter that proactively uses a chromatic aberration caused by the confocal optical system can be used for performing various measurements such as a measurement of an outline/shape in a mm order, a measurement of a minute shape in a μm order, and a measurement of a work surface property. Meanwhile, a coaxial observation of a measurement work has been difficult to be performed based on that measurement principle.

Since a work cannot be observed, a measurement of a μm-order work in particular has required time for positioning and a check of a measurement part. Moreover, due to the principle of measuring a distance/displacement using a chromatic dispersion of light as a scale, a coaxial observation using an objective lens having an axial chromatic aberration has been extremely difficult, and a non-coaxial observation has been difficult in a case where the work is a steep slope, and the like.

By adding the observation unit 70 exemplified in FIG. 4 in this embodiment, the monitoring function is realized, and a coaxial observation of a measurement work becomes possible. Accordingly, positioning and a check of a measurement part are facilitated, measurements can be performed at high speed, and measurement accuracy can be improved. By setting the wavelength of the observation light N to be visible light, the observation light N can also be used as guide light. Accordingly, rough positioning can be performed by visual contact, and measurements can be performed at higher speed. Moreover, since a state of a measurement work can be observed, dust, scratch, smear, and the like can be distinguished from one another at a time abnormal data is detected and the like, and thus it becomes possible to improve user-friendliness and reliability.

Further, by attaching the guide light units 80 and 90 exemplified in FIGS. 5 and 7, it becomes possible to realize the guide light function and laser sight function. As a result, workability of measurement operations and measurement accuracy can be sufficiently improved.

Furthermore, the dichroic mirror 15 is arranged between the objective lens 12 including a chromatic aberration within the confocal optical system and the connection port 13 in this embodiment. The observation unit 70 or the guide light unit 80 or 90 is attached while using the dichroic mirror 15 as a reference. Accordingly, it becomes possible to combine other observation optical systems or laser optical systems while maintaining measurement accuracy of the wavelength confocal type high, and design thereof is also facilitated. Further, since there is no need to add an optical member and the like between the objective lens 12 and the object to be measured O, an operating distance (distance between objective lens 12 and object to be measured O) can be sufficiently secured, and high workability can be exerted.

For example, in the structure disclosed in Patent Literature 1 above in which a microscope and a chromatic confocal sensor are integrated, an objective lens of the microscope is used in common. In this case, an optical path of each of a plurality of light beams separated on an axis by a chromatic aberration of an afocal dispersion lens may be disturbed by wavelength dependency of the objective lens and the like. As a result, there is a high possibility that height measurement accuracy will be significantly lowered. In contrast, since other optical systems are added while using the confocal optical system as a reference in the chromatic sensor according to the present technology, high measurement accuracy can be exerted.

Other Embodiments

The present invention is not limited to the embodiment described above, and various other embodiments can also be realized.

In the descriptions above, light having a wavelength not included in the wavelength band of light for a position measurement (white light W in descriptions above) is used as the observation light and guide light, but the present invention is not limited thereto. For example, light having the same wavelength band as the light for a position measurement may be used as the observation light and the like.

For example, referring to the optical head 10 exemplified in FIG. 4, a white LED may be used as the observation light source 71. In this case, a half mirror is used as the beam splitter in place of the dichroic mirror 15. Accordingly, a color image of a measurement part can be generated based on an output of the image sensor 75. As a result, observation accuracy of a measurement part is sufficiently improved, and high measurement accuracy is exerted. It should be noted that in this case, a light-emitting timing of white light by the light source portion 40 and the observation light source 71 is controlled as appropriate.

It should be noted that in a case where a white LED is used as the observation light source 71, a correction lens that corrects a chromatic aberration caused when the observation light (white light) reflected by the object to be measured O passes through the objective lens 12 may be arranged. For example, the imaging lens 74 shown in FIG. 4 may be set to include the correction function. For example, the imaging lens 74 including an aberration property opposite to that of the objective lens 12 is arranged. Accordingly, it becomes possible to correct a chromatic aberration of the observation light and generate a highly-accurate image of an observation part.

It should be noted that a configuration in which a half mirror is arranged in the casing portion 11 and the observation light source of the observation unit 70 is omitted is also possible. In this case, light obtained by excluding the measurement light M from the white light (plurality of visible light beams) reflected by the object to be measured O enters the image sensor 75. It is possible to observe the measurement part using an image generated accordingly, but an observable area on the object to be measured O is not that large.

In addition, observation light including a wavelength band that overlaps with the wavelength band of light for a position measurement may also be used. By designing and arranging a beam splitter that splits these light beams as appropriate, a position measurement of the object to be measured O and an observation of an observation part become possible. Also for the guide light, visible light included in the wavelength band of light for a position measurement may be used. For example, by using a half mirror, the guide light can be irradiated onto the object to be measured O.

Figure 9:
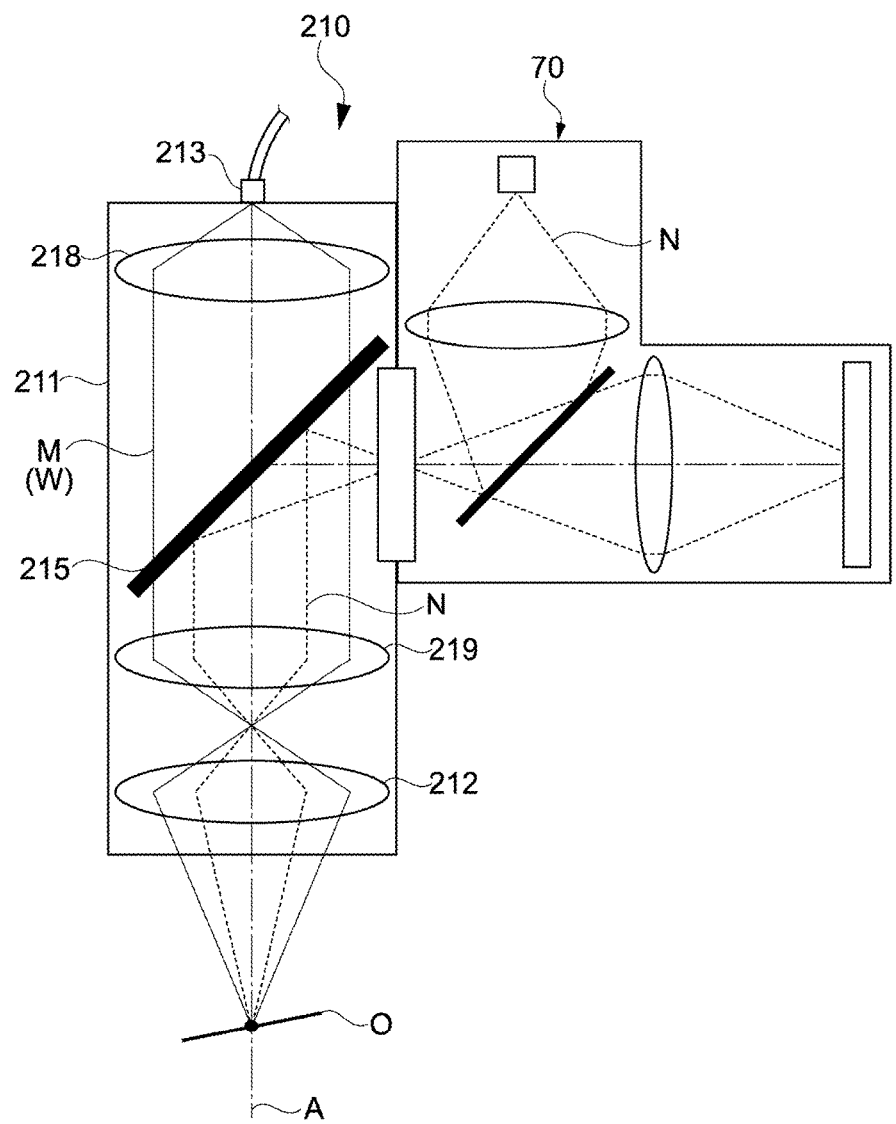
FIG. 9 is a schematic diagram showing an internal configuration example of an optical head according to another embodiment.

FIG. 9 is a schematic diagram showing an internal configuration example of an optical head according to another embodiment. In this optical head 210, a collimator lens 218 and a relay lens 219 are arranged between an objective lens 212 and a connection port 213. The collimator lens 218 is arranged in the vicinity of the connection port 213 and parallelizes white light W emitted inside a casing portion 211. The relay lens 219 is arranged in the vicinity of the objective lens 212 and converges the parallelized white light W toward the objective lens 212.

A dichroic mirror 215 that transmits the measurement light M and reflects the observation light N is arranged between the collimator lens 218 and the relay lens 219. Accordingly, it becomes possible to separate light at a position where light beams (light flux) become parallel to the optical axis A and sufficiently prevent an optical axis deviation and the like from occurring. Moreover, angle dependency of the dichroic mirror 215 can be suppressed. As a result, it becomes possible to suppress an influence of the addition of the dichroic mirror 215 on a wavelength-confocal-type measurement. It should be noted that it does not mean that there is always an influence of the addition of the dichroic mirror 215 in a configuration in which the collimator lens 218, the relay lens 219, and the like are not used.

In the example shown in FIG. 4, the observation unit 70 configured as a single unit is used. The present invention is not limited to this, and the observation light source 71 and the image sensor 75 may be arranged independent from each other. For example, an image pickup unit that accommodates the image sensor 75 and the imaging lens 74 is connected to the connection portion 17 of the casing portion 11. Then, the observation light source 71 is arranged in the vicinity of the irradiation surface 14 of the casing portion 11. Also with such a configuration, an image of a measurement part can be generated.

Further, a portion of the observation unit 70 where the observation light source 71 is arranged may further include a detachable unit configuration, and a light source unit equipped with laser light may be attached to that portion. Accordingly, observation light and guide light can be switched with ease.

The observation unit 70 shown in FIG. 4 may be integrated with the casing portion 11. In other words, a detachable connection configuration does not need to be realized. Since the monitoring function described above is exerted also in this case, the object to be measured can be measured highly accurately. Similarly, the guide light unit may also be integrated with the casing portion.

Furthermore, in the descriptions above, white light is used as light including a plurality of visible light beams for a position measurement. The present invention is not limited thereto and is also applicable to a case where other wideband light is used. Specifically, ultraviolet rays, infrared rays, and the like as invisible light may be emitted as the plurality of light beams having different wavelengths. For example, it is possible to use an LED that emits ultraviolet rays, or the like as the light source unit according to the present invention.

At least two of the feature portions according to the present invention described above can be combined. Moreover, the various effects described above are mere examples and should not be limited thereto, and other effects may also be exerted.

What is claimed is:
1. A chromatic confocal sensor, comprising:
a light source portion that emits a plurality of light beams having different wavelengths;
an objective lens that converges each of the plurality of light beams at different focal positions;
an emission port from which measurement light reflected by an object to be measured at the focal positions out of the plurality of light beams is emitted;
a position calculation portion that calculates a position of the object to be measured based on the emitted measurement light;
an observation portion including an observation light source that emits observation light and an image sensor, the observation light source being a different member from the light source portion; and
a beam splitter that emits at least a part of the measurement light that is reflected by the object to be measured and then passes through the objective lens to the emission port and emits at least a part of the observation light that is reflected by the object to be measured and then passes through the objective lens to the image sensor.

2. The chromatic confocal sensor according to claim 1, wherein
the beam splitter is arranged between the objective lens and the emission port and emits the plurality of light beams emitted from the light source portion and the observation light emitted from the observation light source toward the objective lens along the same optical axis.

3. The chromatic confocal sensor according to claim 1, wherein
the light source portion emits light of a plurality of wavelengths included in a predetermined wavelength band,
the observation light source emits light of a wavelength not included in the predetermined wavelength band, and
the beam splitter is a dichroic mirror that separates the light of the plurality of wavelengths emitted from the light source portion and the light of the wavelength emitted from the observation light source.

4. The chromatic confocal sensor according to claim 3, wherein
the light source portion emits white light, and
the observation light source emits infrared light.

5. The chromatic confocal sensor according to claim 1, wherein
the observation portion is configured as a unit, and
the chromatic confocal sensor further comprises
a connection portion that is provided while using a position of the beam splitter as a reference and from which the observation portion can be detached.

6. The chromatic confocal sensor according to claim 5, further comprising
a guide light irradiation portion that is connectable with the connection portion and is configured as a unit including a laser light source that emits guide light,
wherein the beam splitter emits the guide light emitted from the laser light source of the guide light irradiation portion connected to the connection portion toward the objective lens.

7. The chromatic confocal sensor according to claim 6, wherein
a spot shape of the guide light to be irradiated onto the object to be measured is a ring shape.

8. The chromatic confocal sensor according to claim 6, wherein
the guide light is visible light.

9. The chromatic confocal sensor according to claim 1, wherein
the observation light is visible light.

10. The chromatic confocal sensor according to claim 1, wherein
the observation light source emits light that is the same as that of the light source portion, and
the beam splitter is a half mirror.

11. The chromatic confocal sensor according to claim 10, wherein
the light source portion and the observation light source emit white light.

12. The chromatic confocal sensor according to claim 10, wherein
the observation portion includes a correction lens that corrects an aberration of the observation light reflected by the object to be measured, the aberration being caused by the objective lens.

13. The chromatic confocal sensor according to claim 1, further comprising a casing accommodating the objective lens and the beam splitter, wherein
the casing comprises a connection portion to which the observation portion is connected, the connection portion being positioned such that the observation light emitted from the observation light source is reflected by the beam splitter toward the objective lens along an optical axis of the objective lens.

14. The chromatic confocal sensor according to claim 1, further comprising:
a first casing accommodating the objective lens and the beam splitter; and
a second casing accommodating the observation light source and the image sensor, wherein
the first casing comprises a connection portion to which the second casing is connected such that the observation light emitted from the observation light source is reflected by the beam splitter toward the objective lens along an optical axis of the objective lens.

* * * * *